United States Patent
Tipper (10) Patent No.: US 12,022,210 B2
(45) Date of Patent: Jun. 25, 2024

(54) COMPUTER IMPLEMENTED METHOD FOR DETECTING PULSED RADIATION

(71) Applicant: The Secretary of State for Defence, Salisbury (GB)

(72) Inventor: Sean Michael Tsi-ong Tipper, Salisbury (GB)

(73) Assignee: The Secretary of State for Defence, Salisbury (GB)

( * ) Notice: Subject to any disclaimer, the term of this patent is extended or adjusted under 35 U.S.C. 154(b) by 80 days.

(21) Appl. No.: 17/907,588

(22) PCT Filed: Mar. 26, 2021

(86) PCT No.: PCT/GB2021/000030
§ 371 (c)(1),
(2) Date: Sep. 28, 2022

(87) PCT Pub. No.: WO2021/198631
PCT Pub. Date: Oct. 7, 2021

(65) Prior Publication Data
US 2023/0146106 A1    May 11, 2023

(30) Foreign Application Priority Data
Apr. 3, 2020 (GB) .................................... 2004950

(51) Int. Cl.
*H04N 25/40*    (2023.01)
*H04N 25/779*    (2023.01)

(52) U.S. Cl.
CPC .......... *H04N 25/40* (2023.01); *H04N 25/779* (2023.01)

(58) Field of Classification Search
CPC ........ G01J 11/00; G01S 7/4804; H04N 25/40; H04N 25/779
See application file for complete search history.

(56) References Cited

U.S. PATENT DOCUMENTS

| | | | |
|---|---|---|---|
| 9,564,966 B1* | 2/2017 | Breuer | H04W 4/023 |
| 2013/0034114 A1* | 2/2013 | Schill | H01S 3/1305 372/18 |

(Continued)

FOREIGN PATENT DOCUMENTS

| | | |
|---|---|---|
| DE | 19851010 A1 | 6/2007 |
| GB | 2559657 A | 8/2018 |

(Continued)

OTHER PUBLICATIONS

International Patent Application No. PCT/GB2021/000030, International Preliminary Report on Patentability dated Oct. 18, 2022, 8 pages.

(Continued)

*Primary Examiner* — Amy R Hsu
(74) *Attorney, Agent, or Firm* — Kilpatrick Townsend & Stockton LLP (57) ABSTRACT

Techniques for detecting pulsed radiation. A CMOS sensor array being irradiated across at least a portion of the array with pulsed radiation is addressed using a rolling shutter operation. The sensor array is read to extract the integrated energy from each sensor element and convert the integrated energy into a pixel value for a pixel in a radiation image. A pulse detection operation is then applied to the radiation image to obtain a pulse repetition frequency of the pulsed radiation. The pulse detection operation includes extracting a beat signal, calculating a beat frequency and peak to trough ratio from the beat signal, and determining the pulse repetition frequency therefrom. Particularly suited to the technical field of pulsed laser detection. Also relates to a pulse detector for the same.

18 Claims, 6 Drawing Sheets

(56) References Cited

U.S. PATENT DOCUMENTS

| | | | |
|---|---|---|---|
| 2017/0201059 A1* | 7/2017 | Villeneuve | G01S 7/4873 |
| 2019/0098233 A1* | 3/2019 | Gassend | H04N 23/71 |
| 2020/0120247 A1* | 4/2020 | Iguchi | H04N 23/56 |
| 2020/0400821 A1* | 12/2020 | Baker | G01S 7/4804 |

FOREIGN PATENT DOCUMENTS

| | | |
|---|---|---|
| GB | 2575717 A | 1/2020 |
| JP | 2008188216 A | 8/2008 |
| WO | 2019209727 A1 | 10/2019 |

OTHER PUBLICATIONS

United Kingdom Patent Application No. 2004950.8, Search Report dated Oct. 1, 2020, 3 pages.

International Patent Application No. PCT/GB2021/000030, International Search Report and Written Opinion dated Jul. 2, 2021, 14 pages.

United Kingdom Patent Application No. GB2104301.3, Combined Search and Examination Report dated Aug. 16, 2021, 6 pages.

* cited by examiner

| A''' | B''' | C''' | D''' | E''' | F''' |
|---|---|---|---|---|---|
| 1 | 1 | 0.5 | 0.5 | 1 | 1 |

COMPUTER IMPLEMENTED METHOD FOR DETECTING PULSED RADIATION

TECHNICAL FIELD OF THE INVENTION

This invention relates to the field of detecting pulsed radiation, in particular to methods and apparatus suitable for use in detecting pulsed laser radiation and extracting their pulse repetition frequencies.

BACKGROUND TO THE INVENTION

Pulsed radiation is used in a variety of applications, from communications through to laser range finding and designation. In particular pulsed lasers may be used to delivery temporally short, high intensity, pulses of power onto an unknowing receiver with the deliberate intent to cause damage. Owing to the variety of applications of pulsed radiation, there exists a requirement for pulsed radiation detection. Detectors of pulsed radiation often become more expensive as the temporal demand on them (for instance laser pulse repetition frequency) increases. These expensive detectors are also undesirable in applications where there is a risk of detector damage (for instance when subject to high pulse powers). Therefore a number of lower cost detectors and detection methods have been developed to mitigate these issues.

An example of a low cost method of detecting pulsed radiation is provided in GB1907210.7. The method comprises irradiating a portion of an array of sensor elements with pulsed radiation and addressing the array using a rolling shutter operation to obtain a radiation image. A pulse detection operation is applied to the radiation image to detect a pulse repetition interval (or equivalently a frequency) of the pulsed radiation. The rolling shutter operation addresses lines of sensor elements in the array for a predetermined and configured integration period. This permits a low cost camera device to have wider utility in detecting higher frequency events than the standard frame rate would suggest. However the method disclosed in GB1907210.7 is limited in frequency coverage based on the Nyquist Theorem of sampling. Naturally for a discrete detector, the maximum signal frequency that can be successfully extracted through a sampling operation is expected to be equivalent to twice the sampling rate. Even though GB1907210.7 improves upon the detection limitation imposed by the frame rate of a camera, it is still limited by the minimum predetermined integration period permitted by the camera or sensor array. This is typically the row read out and reset time of the rolling shutter operation of the camera. This renders a number of low cost detectors and their detection methods unsuitable for use above a certain frequency.

Therefore it is an aim of the present invention to provide a method of detecting pulsed radiation that mitigates this issue.

SUMMARY OF THE INVENTION

According to a first aspect of the invention there is provided a computer implemented method for detecting a pulse repetition frequency of pulsed radiation using a sensor array of sensor elements arranged in element lines, the method comprising the steps of: addressing the sensor array of sensor elements using a rolling shutter operation, wherein the rolling shutter operation comprises addressing each element line consecutively for a predetermined integration period; reading the sensor array to obtain a radiation image, the radiation image comprising a plurality of pixel values, with each pixel value corresponding to a sensor element in the sensor array; and then applying a pulse detection operation to the radiation image, thereby detecting the pulse repetition frequency of the pulsed radiation; characterised in that the pulse detection operation comprises: extracting a beat signal from the pixel values of the radiation image in a sensor array direction corresponding to the direction of the rolling shutter operation; calculating a beat frequency from the beat signal; calculating a peak to trough ratio from the beat signal; and then calculating a pulse repetition frequency of the pulsed radiation using a pulse repetition frequency function, the pulse repetition frequency function being a function of the beat frequency and peak to trough ratio.

The inventors have recognised that a rolling shutter operation configured to address each element line consecutively can be considered to be continuously receiving pulsed radiation. At frequencies above the maximum frequency discernible under Nyquist (for a modified rolling shutter operation, equivalent to the reciprocal of twice the predetermined integration period), a beating effect occurs between the pulse repetition interval (equivalently pulse repetition frequency) of the pulsed radiation and the predetermined integration period of the rolling shutter operation. This beating effect is evident in the integrated energy received and stored for each element line in the sensor array. Also evident is that for increasing pulse repetition frequency of pulsed radiation, the number of cycles or waves of radiation integrated within a given predetermined integration period increases. Therefore the peak to trough ratio of the beating effect also can vary. In isolation neither the beat frequency nor peak to trough ratio is unique to a single pulse repetition frequency of pulsed radiation. However the inventors have shown their combination is. Therefore even pulse repetition frequencies above the apparent limitation related to the predetermined integration period can now be detected using low cost rolling shutter devices.

Pulsed radiation is intended to mean electromagnetic radiation in the form of pulses repeating at a pulse repetition interval (the inverse therefore being the pulse repetition frequency). The pulses themselves are discretely separate from each other in time. A pulse may have constant amplitude during its 'on' period, or may have variable amplitude, for instance further modulation may be present on the pulse itself for communication purposes. Radiation may be generated through use of a radiation source such as an LED, laser diode, or a laser. The pulsed radiation may be generated directly by the radiation source (for instance a laser switched on and off, or a Q-switched laser) or may be generated by the radiation source outputting continuous radiation that is then modulated (for instance by an electro-optic modulator).

A sensor element means a device that is suitable for detecting electromagnetic radiation that has the wavelength of the pulsed radiation. The sensor element itself converts the pulsed radiation incident upon it to electrical energy. The material of which the sensor element is formed will be dependent therefore upon the wavelength of the pulsed radiation intended to be detected.

The sensor array of sensor elements is a plurality of sensor elements arranged in at least one dimension, as a plurality of element lines. Each element line being a linear distribution of sensor elements and may refer to a row of, for instance, a two dimensional array or a column of a two dimensional array. Each sensor element in the element array may be electrically isolated, such that the electrical energy generated by each element can be individually determined. An example of such an array is a CMOS sensor. A radiation image of a scene can be obtained by measuring the electrical energy generated by each sensor element in the sensor array. The sensor array in use would be irradiated with pulsed radiation across a plurality of element lines and the computer implemented method operated thereon.

In a rolling shutter operation each element line in a sensor array is addressed (allowed to convert incident radiation to electrical energy) for an integration period. After this period for a given element line, the electrical energy generated therefrom is 'read-out' for analysis in a data processing system. Each element line must be read-out separately in a rolling shutter operation, and therefore whilst each element line is addressed for the same integration period, the integration periods are not initiated simultaneously (as for a global shutter camera) and instead only partially overlap in time. For most rolling shutter cameras (for instance CMOS cameras such as used in mobile phones) the integration period is an unknown variable, with only the overall frame rate or inter-frame time being directly variable. This introduced an inherent limitation in the ability of a rolling shutter camera to detect high frequency events. This was improved upon in GB1907210.7 through varying of the element line integration periods to predetermined values related to pulse repetition frequencies of pulsed radiation. The inventors have now improved this capability further, to allow detection of frequencies beyond even the limitation imposed by the minimum predetermined integration period available for a rolling shutter camera (equivalent to the row readout time).

The radiation image obtained from the invention is at least a one dimensional (but preferably two dimensional) representation of the electrical energy generated by the sensor elements in the sensor array. When element lines in the sensor array have been exposed, the electrical energy generated from each sensor element may be transmitted into a processing system such as a computer and stored digitally as pixel values.

The pulse detection operation is a computer implemented operation that extracts the pulse repetition frequency of the pulsed radiation from the pixel values in the radiation image. The beat signal manifests as a variation in pixel value in a sensor array direction that is in the direction of the rolling shutter operation (the direction or order in which the element lines of the sensor array are addressed). This is because the pulse repetition interval of the pulsed radiation is not perfectly matched with the predetermined integration period of the element lines. This beat signal can be extracted directly from the pixel values of the radiation image.

The beat frequency itself relates to the periodicity of the variation in pixel value in the direction of the rolling shutter operation. This is preferably calculated by performing a Fourier Transform of the beat signal (for instance a spatial Fourier Transform of the radiation image in the direction of the rolling shutter operation). The peak to trough ratio is the ratio of the maximum pixel value of the beat signal to the minimum pixel value of the beat signal. Both the beat frequency and the peak to trough ratio are used within a pulse repetition frequency function to determine the true pulse repetition frequency of the pulsed radiation.

The pulse repetition frequency function may be a mathematical formula, but preferably is a data array of known pulse repetition frequencies with corresponding beat frequencies and peak to trough ratios. This allows the computer implemented method to be configured to detect both small and large subsets of pulse repetition frequencies. In these embodiments the step of calculating the pulse repetition frequency comprises performing a lookup operation of the beat frequency and peak to trough ratio with the data array.

In preferred embodiments of the invention the pulsed radiation is pulsed laser radiation. Pulsed laser radiation can be utilised in many applications owing to the narrow divergence of a laser delivering pulsed radiation at greater ranges than an alternative radiation device. Pulsed lasers are also used in many applications owing to the high pulse repetition rates achievable. Therefore the ability to modify a rolling shutter camera, already available in many electronic devices to provide a laser based communications capability, is particularly advantageous. The pulsed laser radiation maybe visible for near infrared laser radiation, for instance.

In some embodiments of the computer implemented method used with pulsed laser radiation, the sensor array is a colour camera. A colour camera is suitable for detecting pulsed laser radiation according to the invention because the laser radiation is very narrow band and therefore despite filtering of the laser radiation through the various colour filters in a colour camera, the beat signal will still be evident above background noise in the radiation image.

Alternatively the sensor array may be a monochrome camera capable of receiving the pulsed radiation. A monochrome camera does not filter the pulsed radiation as in a colour camera, and therefore even broadband pulsed radiation as well as pulsed laser radiation will induce a beat signal in the radiation image that can be extracted.

In preferred embodiments the predetermined integration period is substantially equal to a row read out time of the rolling shutter operation. The row read out time is the minimum predetermined integration period achievable in a rolling shutter camera, because of the fundamental requirement to read out the integrated energy from an element line before the next element line is addressed. Whilst the invention can operate with integration periods that are not substantially equal to the row read out time, this leads to an overlap in integration periods between the element lines and can distort the beat signal. Therefore it is preferred that the integration periods substantially equal the row read out time such that they do not overlap in time.

In some embodiments the pulse repetition frequency $f_{PRF}$ of the pulsed radiation satisfies Equation 1, $$f_{PRF} > \frac{1}{2T_{readout}} \quad \quad \text{Equation 1}$$

wherein $t_{readout}$ is the row read out time of the rolling shutter operation. The method of the invention is particularly suited to resolving pulsed radiation beyond the apparent Nyquist limit. This further improves the capability of lower cost rolling shutter detectors and cameras.

In even more preferred embodiments, the pulse repetition frequency $f_{PRF}$ of the pulsed radiation satisfies Equation 2.

$$f_{PRF} \leq 100 \text{ kHz} \quad \quad \text{Equation 2}$$

The method of the invention is particularly well suited to detecting pulsed radiation from devices operating with repetition frequencies equal to or below 100 kHz, through use of modified off the shelf CMOS sensors.

In some embodiments the step of calculating a beat frequency comprises applying a Fourier Transform to the beat signal. A Fourier Transform is a convenient computer implemented algorithm for extracting frequency components of a signal. A spatial Fourier Transform may for instance be applied to the pixel values of the radiation image in an array direction corresponding to the direction of the rolling shutter operation. In scenarios where the irradiance falling upon an individual sensor element is relatively low, the electrical energy generated by each sensor element in an element line may be integrated by virtue of summing the pixel values for that element line, the Fourier transform then acting on the summed pixel values of each of the element lines.

In some embodiments the step of calculating a peak to trough ratio comprises calculating an average peak to trough ratio over a plurality of cycles of the beat signal. By calculating the peak to trough ratio across a plurality of cycles of the beat signal, the impact of spurious errors in signal on the calculation is minimised. This leads to a computer implemented method that is more tolerable to random effects and noise.

In preferred embodiments of the computer implemented method, upon detecting pulsed radiation, a protection means may be triggered. Pulsed radiation, in particular pulsed laser radiation may be damaging to the device upon which the method of the invention is being operated, or may be damaging to a device that is connected or in communication with the device upon which the method is operated. Therefore, it is advantageous to be able to activate or trigger protection means to protect said devices from damage. The protection means may be simply a reduction in gain applied to the sensor elements, or may be the introduction of a neutral density filter or sacrificial element in front of the array of sensor elements or in front of another sensor. The protection means may be a command to steer the device away from the current pointing direction and therefore away from the pulsed radiation itself, or may be a warning to not observe a particular viewing angle.

According to a second aspect of the invention, there is provided a computer program comprising computer code which when executed, performs the steps of the first aspect of the invention. The computer program can be conveniently programmed into non-volatile memory of a data processing means within for instance a CMOS camera device such as mobile phone camera.

According to a third aspect of the invention, there is provided computer readable storage media comprising the computer program of the second aspect of the invention. The computer program itself may reside within non-volatile memory that can be connected to and operate with a CMOS camera device, for instance.

According to a fourth aspect of the invention, there is provided a pulsed radiation detector, comprising a sensor array of sensor elements arranged in element lines, and a computer configured to perform the steps of the first aspect of the invention. This allows pulse repetition frequencies even above the limitation related to the predetermined integration period in advanced rolling shutter devices, to now be detected using low cost rolling shutter devices.

Some embodiments of the fourth aspect of the invention further comprise optical means for defocussing pulsed radiation onto at least a portion of the sensor array. This may be achieved in a manner similar to that previously disclosed in GB2559657A, thereby enabling discrimination of laser sources upon which the method of the first aspect of the invention can be exercised. Energy generated by different element lines will have encoded within it information regarding the time varying amplitude of the pulsed radiation. For some radiation sources, such as a laser source that is inherently focussed at infinity, the spatial extent of the laser source on the array of sensor elements may be approximately the same size as a sensor element when the laser radiation is gathered and projected onto the array of sensor elements by a conventional camera lens. By providing optical means for defocussing the pulsed radiation this assists the spreading of pulsed radiation across multiple element lines of the sensor array, facilitating the detection of pulsed radiation using the rolling shutter effect. This may be implemented through use of a suitable optical means such as an optical configuration using lenses or mirrors to redirect/spread the pulsed radiation onto the sensor array. It is accepted that optical scatter effects may assist in spreading pulsed radiation over the sensor array, but reliance on such would not be sufficient for laser sources of relatively low radiative power (such that scatter is simply not detected by the array), and would be unpredictable in nature (changing scatter effects with varying lines of sight to a pulsed radiation source). Therefore the inventors have shown that actively taking the step of defocussing/redirecting/spreading the pulsed radiation onto the sensor array has a beneficial effect.

BRIEF DESCRIPTION OF THE DRAWINGS

Embodiments of the invention will now be described by way of example only and with reference to the accompanying drawings, in which:

FIG. 2b shows an illustration of a radiation image of pulsed radiation, generated by the prior art method of FIG. 2a;

FIG. 3b shows an illustration of a radiation image of pulsed radiation, generated by the method of FIG. 3a;

DETAILED DESCRIPTION

Figure 1:
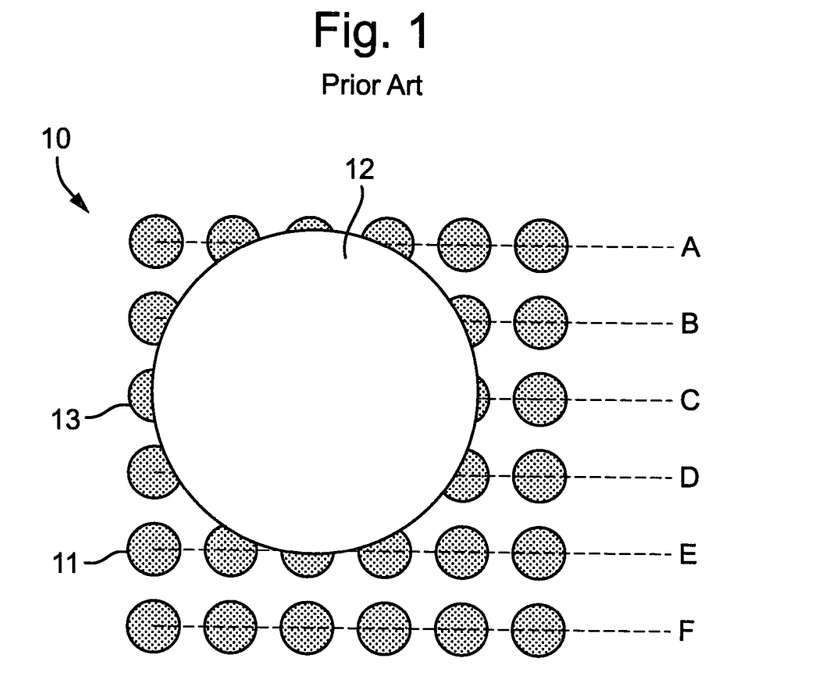
FIG. 1 shows an illustration of a prior art sensor array of sensor elements forming the CMOS sensor in a mobile phone when imaging pulsed laser radiation.

FIG. 1 shows an illustration of a prior art sensor array 10 of sensor elements 11 forming a CMOS sensor of a mobile phone camera. The sensor array 10 comprises element lines A→F. In this illustration, laser radiation 12 has been received by the sensor array 10 across a portion 13 of the sensor array 10. Therefore a plurality of the sensor elements 11 are irradiated.

Figure 2A:
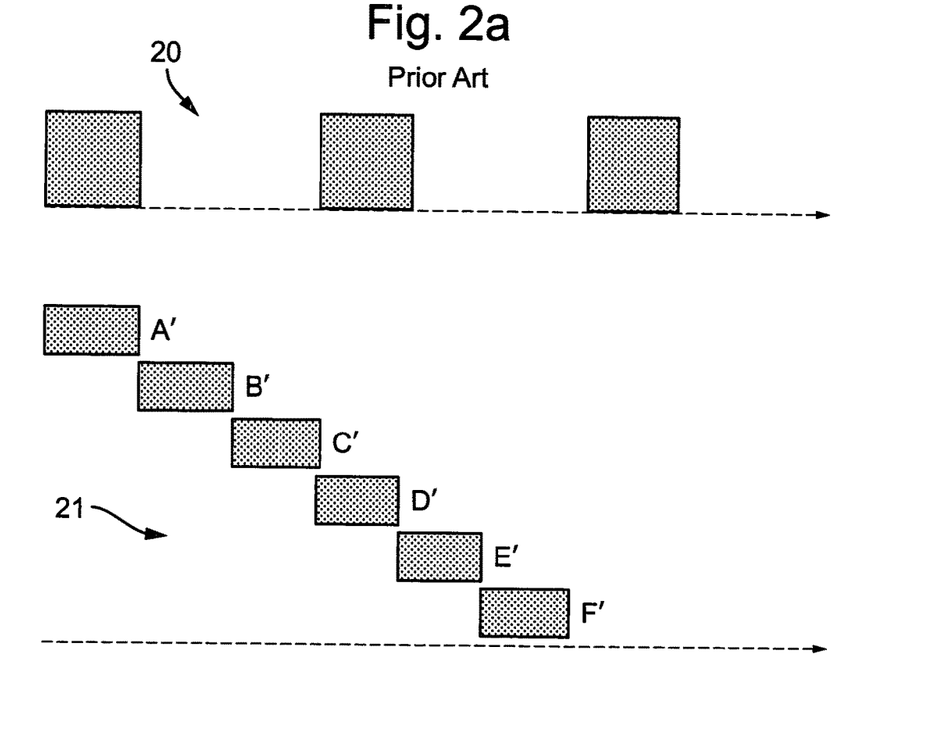
FIG. 2a shows an illustration of a prior art rolling shutter method detecting pulsed radiation having a pulse repetition frequency below the Nyquist limit set by the integration period of the elements lines.

FIG. 2a shows an illustration of a prior art modified rolling shutter operation wherein the element line integration times 21 have been modified. The integration times 21 are labelled A'→F' to correspond to the respective element lines in FIG. 1. Also shown in the figure is pulsed laser radiation 20. It can be seen from the figure that the integration times 21 labelled as A'→F' have been configured such that they do not overlap in time. The integration times 21 are minimised so as to be substantially equal to the row read out time of a rolling shutter operation (this is limited by camera or sensor array used, but for this embodiment is 25 µs). It can be seen that, the integration times A'→F' have been chosen such that each of the laser pulses in pulsed laser radiation 20 only occur in a single element line's integration time.

Figure 2B:
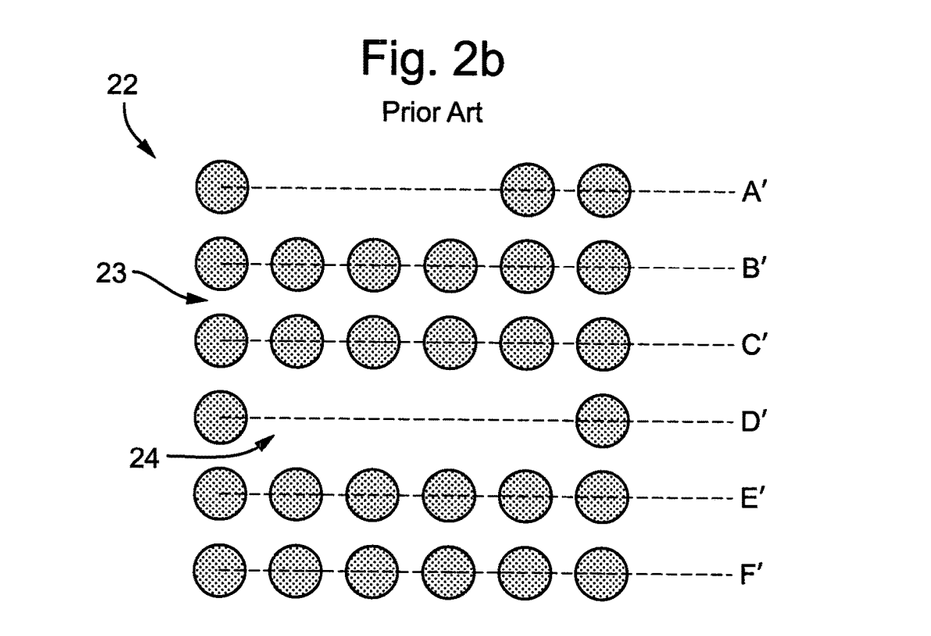

FIG. 2b shows an illustration of a radiation image 22 from a prior art sensor array addressed according to FIG. 2a. There is a clear pattern of dark regions 23 and light regions 24. The radiation image 22 now clearly shows the laser radiation is pulsed laser radiation. This prior art example is operating successfully below the Nyquist limit set by the integration times 21 in FIG. 2a, which here limits detectable frequencies to those having periods less than or equal to the inverse of twice the row read out time of 25 µs. This leads to a maximum detectable pulse repetition frequency of 20 kHz for the camera used (a Raspberry Pi camera v2).

Figure 3A:
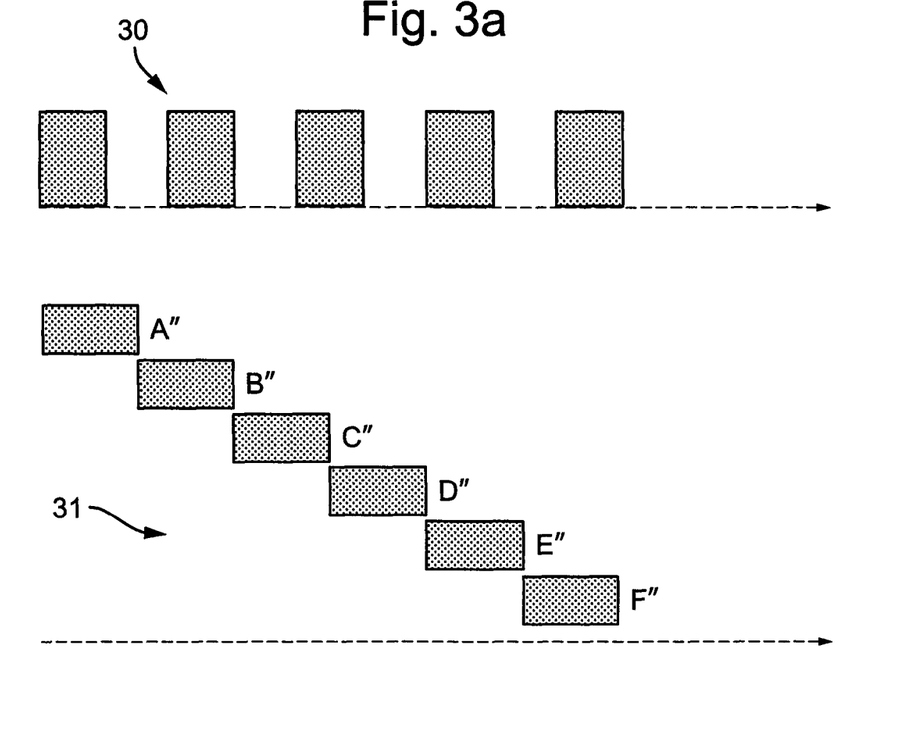
FIG. 3a shows an illustration of a modified rolling shutter method of detecting pulsed radiation having a pulse repetition frequency above the Nyquist limit set by the integration period of the element lines.

FIG. 3a shows an illustration of a modified rolling shutter operation wherein the element line integration times 31 have been modified. The integration times 31 are labelled A"→F" to correspond to the respective element lines in FIG. 1. Also shown in the figure is pulsed laser radiation 30. It can be seen from the figure that the integration times 31 labelled as A"→F" have been configured such that they do not overlap in time. The integration times 31 are minimised so as to be substantially equal to the row read out time of the rolling shutter operation (again equal to 25 µs). It can be seen that the pulsed laser radiation 30 has a pulse repetition frequency such that the rolling shutter operation is operating beyond the Nyquist Limit set by the integration times 31. There are now pulses of pulsed radiation 30 being integrated within multiple integration times 31 labelled A"→F".

Figure 3B:
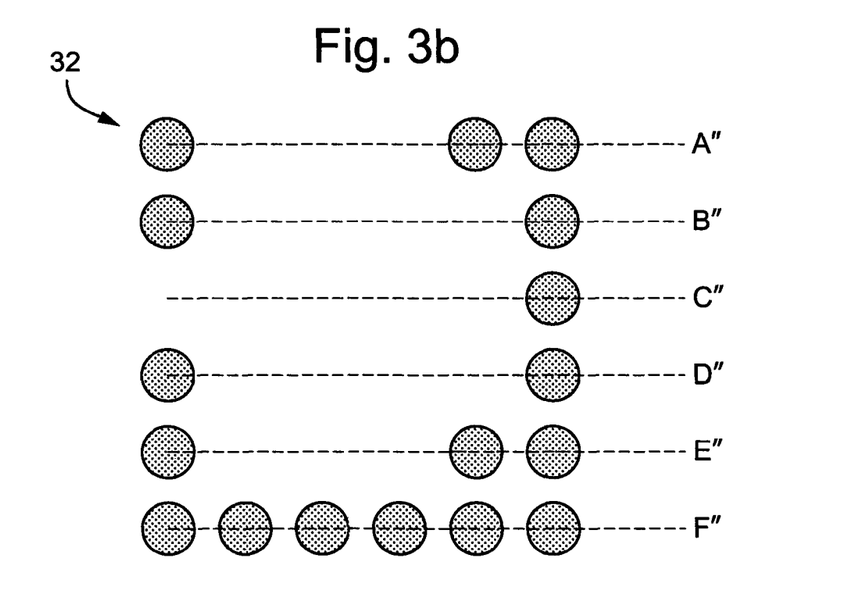

FIG. 3b shows an illustration of a radiation image 32 from the sensor array addressed according to FIG. 3a. There is no clear pattern of dark and light regions. It cannot be clearly observed that there is pulsed radiation present from the single radiation image 32.

Figure 3C:
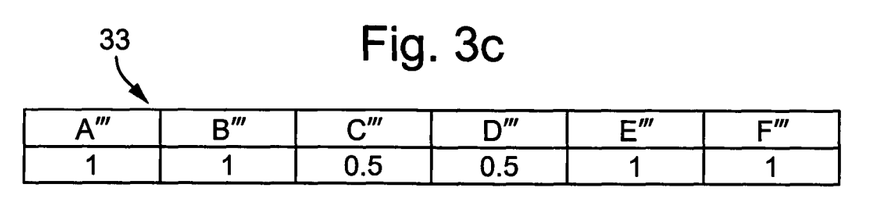
FIG. 3c shows an illustration of the pixel values in the radiation image of FIG. 3b.
Figure 3D:
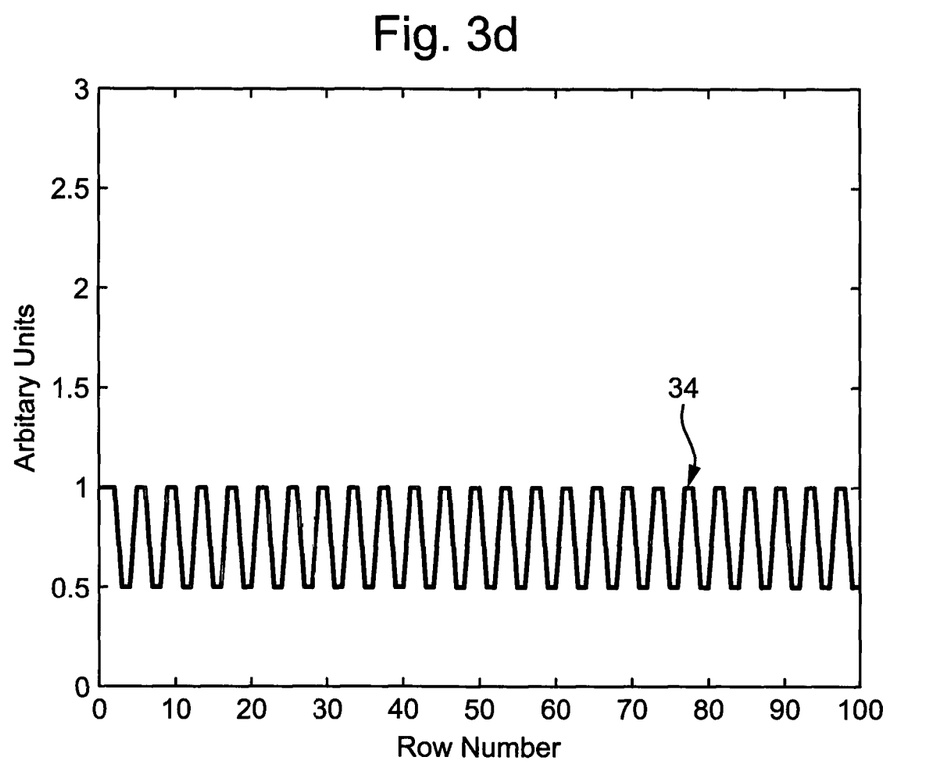
FIG. 3d shows an illustration of a beat signal extracted from the pixel values in FIG. 3c.

FIG. 3c shows an illustration of pixel values 33 of the radiation image 32 in FIG. 3b in arbitrary units. The pixel values 33 have been obtained in an array direction of the radiation image 32 corresponding to the direction of the rolling shutter operation. The pixel values 33 shown are labelled A'''→F''' to highlight correspondence to the element lines A→F in FIG. 1 and therefore the rolling shutter direction. There is a subtle difference between the pixel values 33. This is because the pulse repetition frequency of the pulsed radiation 30 and the integration times 31 are not perfectly matched, and therefore a beating effect is observed in the pixel values. For instance a full pulse of radiation is received in integration periods A''' and B''', but only a partial pulse is received in C''' and D'''. FIG. 3d shows this beat signal 34 extracted from the pixel values across a sensor array of 100 element lines/rows. The beat signal 34 corresponds to a pulse repetition frequency of pulsed radiation equal to 30 kHz.

Figure 3E:
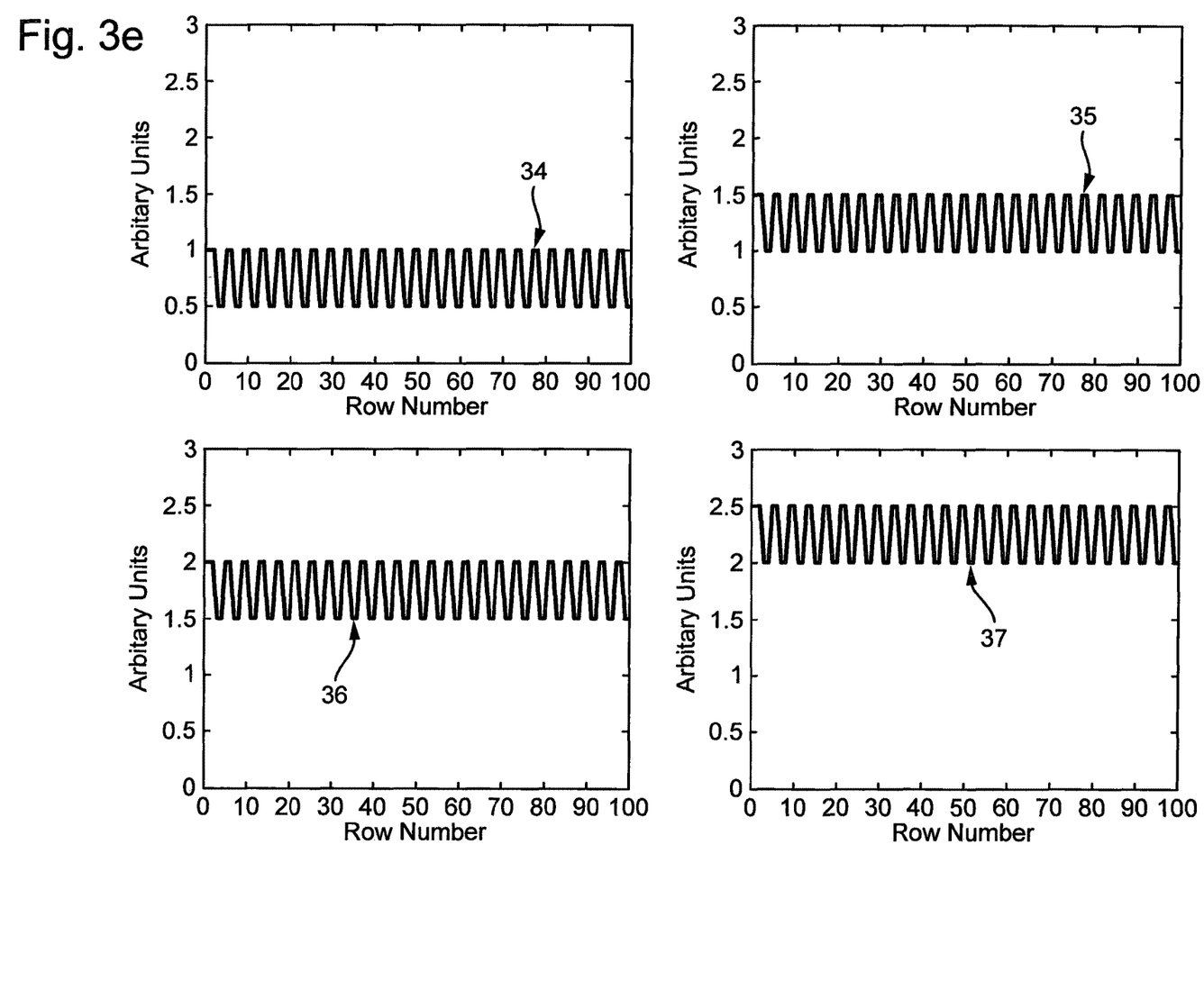
FIG. 3e shows an illustration of different beat signals for different pulse repetition frequencies above the Nyquist limit.

FIG. 3e shows an illustration of different beat signals 34, 35, 36, 37, corresponding to pulse repetition frequencies of 30 kHz, 50 kHz, 70 kHz and 90 kHz, each of which is above the Nyquist limit set by the integration times of FIG. 3a. The beat signals (34-37) in this embodiment have the same beat frequency of 10 kHz and same span (difference between peak and trough values), however the absolute values of the peaks and troughs for each signal are different. This leads to a unique ratio for each beat signal (34-37) despite the beat frequency being the same. The inventors have shown the combination of beat frequency and peak to trough ratio is unique for each pulse repetition frequency of the pulsed radiation, and allows detection of pulse repetition frequencies above the limit of 20 kHz previously imposed by prior art embodiments illustrated in FIGS. 2a and 2b.

Figure 4:
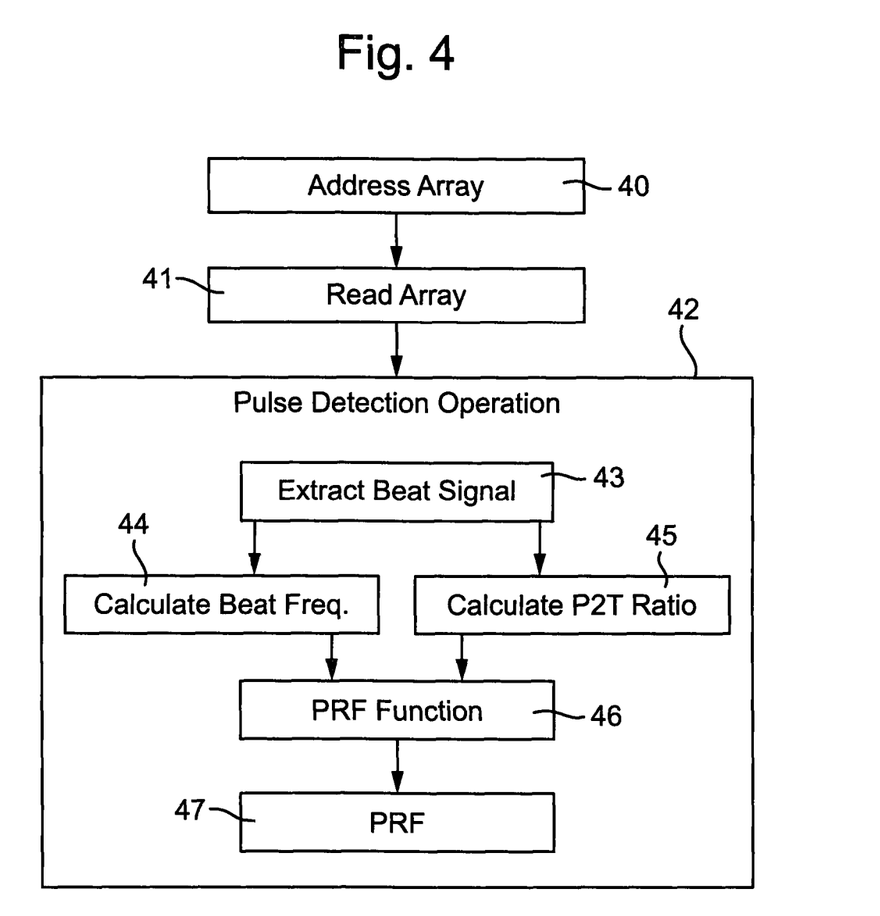
FIG. 4 shows an illustration of a computer implemented method of detecting pulsed radiation.

FIG. 4 shows an illustration of a computer implemented method of detecting pulsed radiation. A CMOS sensor array being irradiated across at least a portion of the array with pulsed radiation is addressed using a rolling shutter operation 40. In the rolling shutter operation each element line in the sensor array is addressed for a predetermined integration period equal to the row read out time of the rolling shutter operation. This is considered the minimum predetermined integration period available, and therefore under the Nyquist regime would correspond to the maximum detectable pulse repetition frequency of the pulsed radiation. In a subsequent step, the sensor array is read 41 to extract the integrated energy from each sensor element and convert the integrated energy into a pixel value for a pixel in a radiation image. This is performed by a computer system, the radiation image being a digital array of pixel values making up a digital image. A pulse detection operation 42 is then applied to the radiation image to obtain a pulse repetition frequency of the pulsed radiation. This involves extracting a beat signal 43 from the radiation image. The pixel values for each element line are summed, the beat signal becoming the summed value as a function of element line or row number, for instance. A beat frequency is calculated 44 from the beat signal using a Fourier Transform. The peak to trough ratio (P2T Ratio) is also calculated 45 from the beat signal across a plurality of cycles in the radiation image and averaged. The beat frequency and peak to trough ratio are then used in a Pulse Repetition Frequency (PRF) function 46 to determine a PRF 47 of the pulsed radiation. The PRF function 46 comprises a lookup operation of the beat frequency and peak to trough ratio with a data array held within computer memory. The data array is a multi-dimensional array containing known pulse repetition frequencies and associated beat frequencies and peak to trough ratios. By matching the beat frequency and peak to trough ratio of the beat signal in the radiation image, a true PRF can be identified for the pulse radiation received by the sensor array. A tolerance may be provided for in the look-up operation, for instance a beat frequency within a range of values, having a peak to trough ratio within a range of values, may correspond to a single known PRF in the data array for instance.

Whilst the figures illustrate pulsed radiation irradiating an array of sensor elements over a circular portion of the array, the method will operate with sensor arrays irradiated over non-circular portions. For instance a substantially linear portion of the array may be irradiated. The radiation may cover the entirety of, or a portion of, the array of sensor elements. A lens arrangement adapted to disperse incoming pulsed radiation may be used. The lens arrangement being configured to disperse the pulsed radiation in a predetermined direction, so that the radiation is spread across the array in that direction. This direction should have a component that is in the direction of the rolling shutter operation (and is typically substantially parallel thereto). This can be achieved by means of addition of a one dimensional dispersion element (e.g. a film or layer) or modification to the lenses), such as a series of parallel ridges on the surface thereof, or it could be achieved by adjusting the focal distance of the lens to be different in the different dimensions of the array. This would allow remote sources to be strongly defocussed across the array in the direction of dispersion (and more focussed in the perpendicular direction). This would provide embodiments of the invention that enable signals to be collected and analysed from more than one source.

The invention claimed is:

1. A computer implemented method for detecting a pulse repetition frequency of pulsed radiation using a sensor array of sensor elements arranged in element lines, the method comprising:
   a) Addressing the sensor array of sensor elements using a rolling shutter operation, wherein the rolling shutter operation comprises addressing each element line consecutively for a predetermined integration period;
   b) Reading the sensor array to obtain a radiation image, the radiation image comprising a plurality of pixel values, each pixel value corresponding to a sensor element in the sensor array; and
   c) Applying a pulse detection operation to the radiation image, thereby detecting the pulsed radiation,
   wherein the pulse detection operation comprises:
   d) Extracting a beat signal from the plurality of pixel values of the radiation image in a sensor array direction corresponding to a direction of the rolling shutter operation;
   e) Calculating a beat frequency from the beat signal;
   f) Calculating a peak to trough ratio from the beat signal; and
   g) Calculating a pulse repetition frequency of the pulsed radiation using a pulse repetition frequency function, the pulse repetition frequency function being a function of the beat frequency and peak to trough ratio.

2. The computer implemented method of claim 1, wherein the pulse repetition frequency function comprises a data array of known pulse repetition frequencies with corresponding beat frequencies and peak to trough ratios, and wherein the calculating a pulse repetition frequency comprises performing a lookup operation of the beat frequency and peak to trough ratio with the data array.

3. The computer implemented method of claim 1, wherein the pulsed radiation is laser radiation.

4. The computer implemented method of claim 3, wherein the sensor array is a colour camera.

5. The computer implemented method of claim 1, wherein the sensor array is a monochrome camera operable to receive the pulsed radiation.

6. The computer implemented method of claim 1, wherein the predetermined integration period is substantially equal to a row read out time of the rolling shutter operation.

7. The computer implemented method of claim 6, wherein the pulse repetition frequency $f_{PRF}$ of the pulsed radiation satisfies:

$$f_{PRF} > \frac{1}{2T_{readout}},$$

wherein $T_{readout}$ is the row read out time of the rolling shutter operation.

8. The computer implemented method of claim 7, wherein the pulse repetition frequency $f_{PRF}$ of the pulsed radiation satisfies:

$f_{PRF} \leq 100$ kHz.

9. The computer implemented method of claim 1, wherein calculating a beat frequency comprises applying a fourier transform to the beat signal.

10. The computer implemented method of claim 1, wherein calculating the peak to trough ratio comprises calculating an average peak to trough ratio over a plurality of cycles of the beat signal.

11. The computer implemented method of claim 1, further comprising triggering a protecting means.

12. A pulsed radiation detector, comprising a sensor array of sensor elements arranged in element lines, and a computer processing device configured to perform the operations of claim 1.

13. The pulsed radiation detector of claim 12, further comprising an optical means for defocussing pulsed radiation onto at least a portion of the sensor array.

14. A non-transitory computer-readable medium storing computer-executable instructions, wherein when executed by a processing device, the computer-executable instructions perform operations comprising:
   addressing a sensor array of sensor elements using a rolling shutter operation, wherein the rolling shutter operation comprises addressing each element line consecutively for a predetermined integration period;
   reading the sensor array to obtain a radiation image, the radiation image comprising a plurality of pixel values, each pixel value corresponding to a sensor element in the sensor array; and
   applying a pulse detection operation to the radiation image, thereby detecting pulsed radiation, wherein the pulse detection operation comprises:
      extracting a beat signal from the plurality of pixel values of the radiation image in a sensor array direction corresponding to a direction of the rolling shutter operation;
      calculating a beat frequency from the beat signal;
      calculating a peak to trough ratio from the beat signal; and
      calculating a pulse repetition frequency of the pulsed radiation using a pulse repetition frequency function, the pulse repetition frequency function being a function of the beat frequency and peak to trough ratio.

15. The non-transitory computer-readable medium of claim 14, wherein the pulse repetition frequency function comprises a data array of known pulse repetition frequencies with corresponding beat frequencies and peak to trough ratios, and wherein the calculating a pulse repetition frequency comprises performing a lookup operation of the beat frequency and peak to trough ratio with the data array.

16. The non-transitory computer-readable medium of claim 14, wherein the predetermined integration period is substantially equal to a row read out time of the rolling shutter operation.

17. The non-transitory computer-readable medium of claim 14, wherein the pulse repetition frequency $f_{PRF}$ of the pulsed radiation satisfies:

$$f_{PRF} > \frac{1}{2T_{readout}},$$

wherein $T_{readout}$ is the row read out time of the rolling shutter operation.

18. The non-transitory computer-readable medium of claim 17, wherein the pulse repetition frequency $f_{PRF}$ of the pulsed radiation satisfies:

$f_{PRF} \leq 100$ kHz.

* * * * *

UNITED STATES PATENT AND TRADEMARK OFFICE
CERTIFICATE OF CORRECTION

| | |
|---|---|
| PATENT NO. | : 12,022,210 B2 |
| APPLICATION NO. | : 17/907588 |
| DATED | : June 25, 2024 |
| INVENTOR(S) | : Sean Michael Tsi-ong Tipper |

It is certified that error appears in the above-identified patent and that said Letters Patent is hereby corrected as shown below:

In the Claims

Column 10, Line 8, Claim 12, replace "of sensor elements arranged in element lines, and a computer" with -- of sensor elements arranged in element lines, and a --.

Signed and Sealed this
Seventeenth Day of September, 2024

Katherine Kelly Vidal
*Director of the United States Patent and Trademark Office*